April 28, 1936.   R. S. NELSON   2,038,951
ABSORPTION REFRIGERATION
Filed May 23, 1931   3 Sheets-Sheet 1

Inventor,
Rudolph S. Nelson
By Harry S. Smarce
Atty.

Witness:
R.B. Davison.

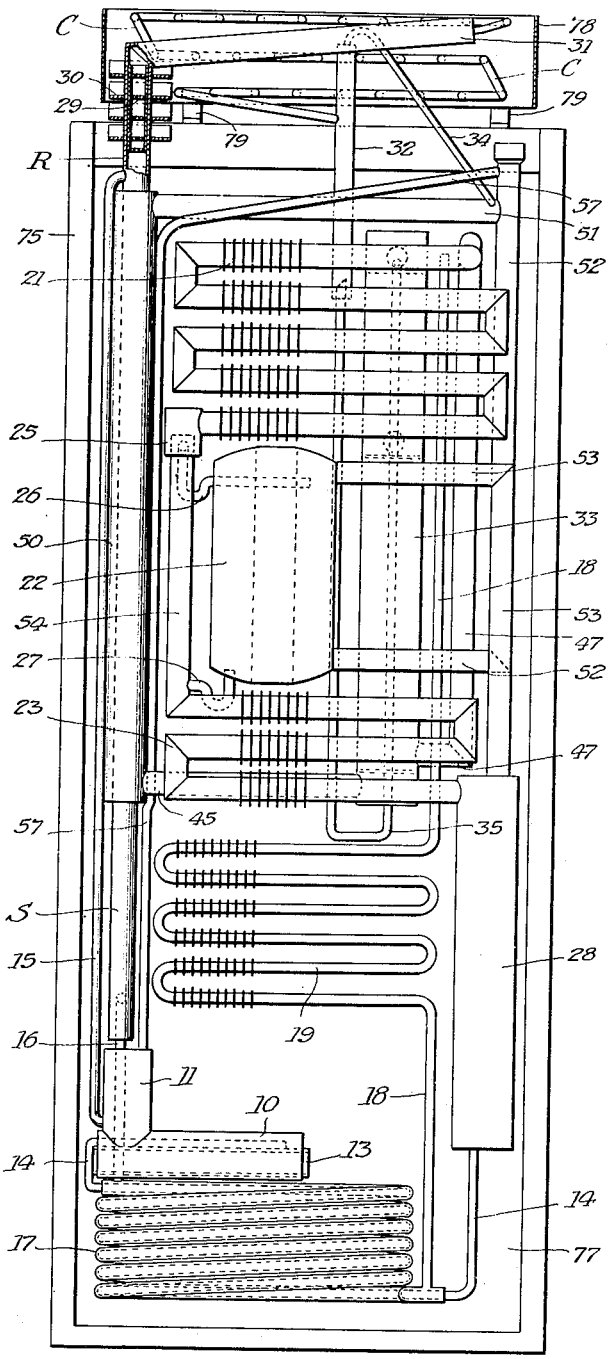

April 28, 1936.   R. S. NELSON   2,038,951
ABSORPTION REFRIGERATION
Filed May 23, 1931   3 Sheets-Sheet 3
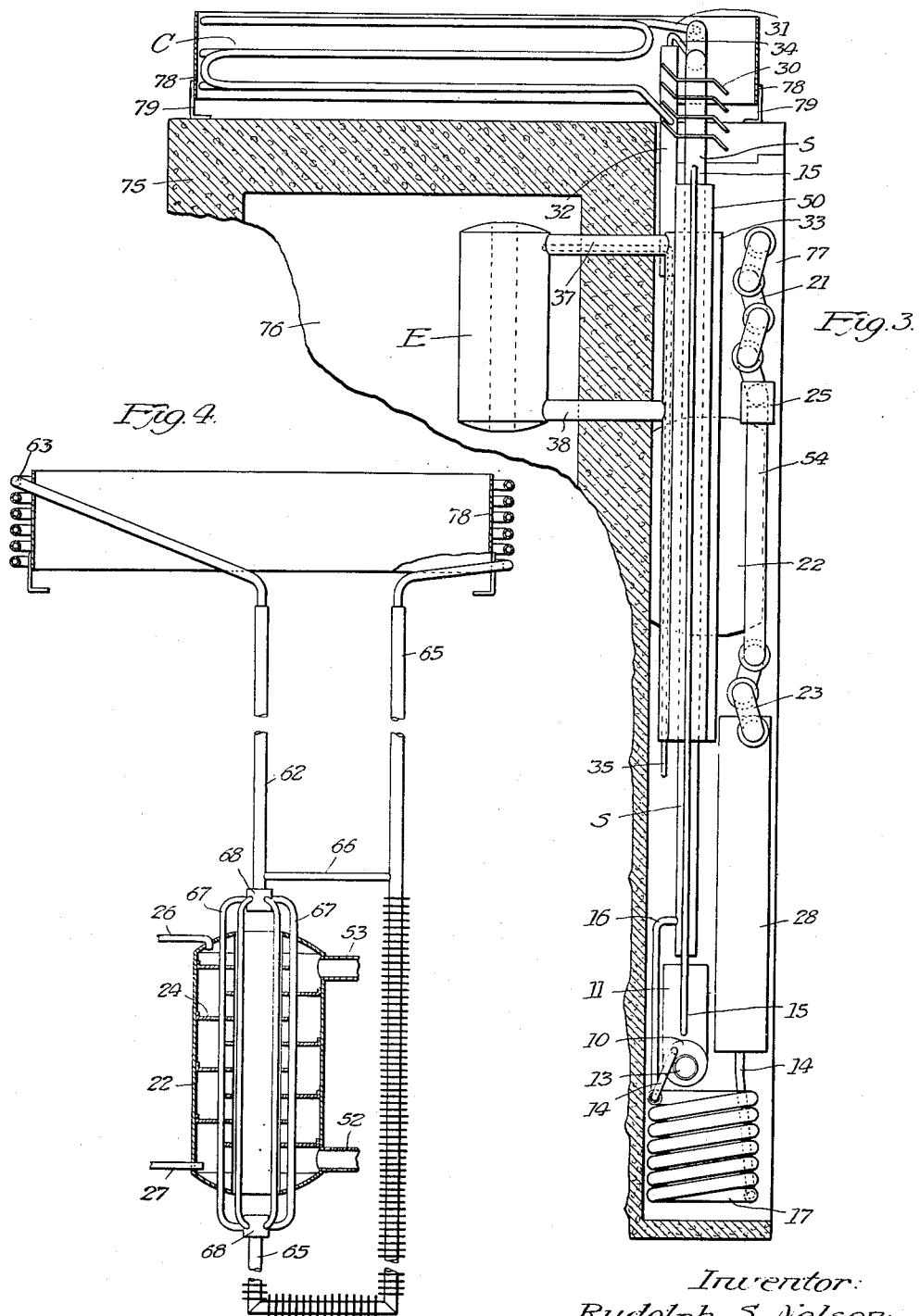

Patented Apr. 28, 1936

2,038,951

UNITED STATES PATENT OFFICE 2,038,951

ABSORPTION REFRIGERATION

Rudolph S. Nelson, Rockford, Ill., assignor to The Hoover Company, North Canton, Ohio, a corporation of Ohio Application May 23, 1931, Serial No. 539,450

6 Claims. (Cl. 62—119.5)

This invention relates to absorption refrigerating system and more particularly to air cooled systems adapted to be installed in a household refrigerating cabinet or the like.

Certain features shown and described herein are claimed in my co-pending application Serial No. 680,749, filed July 17, 1933 and in the co-pending application Serial No. 693,696 filed October 16, 1933, now Patent No. 2,020,654.

Considerable difficulty has been experienced in air cooling small size absorption units due to the fact that the absorber, which must discharge heat to the air, has to be rather definitely located with respect to other parts of the refrigerating system. For that reason it has often been found that after the refrigerating unit has been installed in a cabinet sufficient air does not circulate around the absorber to effectively cool the same, with the result that the unit does not operate satisfactorily.

It has been proposed to employ a small fan, driven by an electric motor or the like, for circulating air over the absorber but this has the obvious disadvantages of increased cost, wear and tear on moving parts, lubrication, etc.

It is an object of the present invention to overcome the difficulty encountered due to the restricted air circulation around the absorber installed in a cabinet by causing some of the heat of absorption to be discharged outside of the enclosure in which the absorber is installed. To this end a part, or all of the absorber may be indirectly cooled by an indirect cooling system such as it is disclosed hereinafter.

A further object is to promote more effective absorption in an absorber by causing different parts of the absorber to function differently while cooperating with each other, to cause a large discharge of heat while reducing the vapor pressure of the refrigerant to a minimum possible at the temperature of the cooling medium. The realization of this object is particularly advantageous when used in air cooled apparatuses of the type in which an inert gas is employed as illustrated below, but the invention is not limited to such apparatuses.

Other objects reside in the novel arrangement and construction of parts as the means for air cooling absorption liquid before it enters the absorber, the boiler construction, the gas heat exchanger and the manner in which the various parts are associated and assembled, together with the methods or processes effected therein as will be pointed out hereinafter in connection with the description.

In the drawings,

Fig. 2 is a view in elevation of a part of an actual working apparatus in which the elements are so assembled as to adapt the unit to be fitted into a refrigerating cabinet, certain of the parts of the apparatus in this figure being shown in cross section.

Fig. 3 is a side view in elevation of the apparatus shown in Figure 2, the cabinet being shown in cross-section and partly cut away.

Fig. 4 is a cross-sectional view, somewhat enlarged, of a part of the absorber shown in Figures 2 and 3 and of a system for indirectly cooling the same, certain parts of the cooling system being broken away or shown in cross section. To avoid complications in illustrating, the indirect cooling system for this part of the absorber is not shown in Figures 2 and 3.

Figure 1:
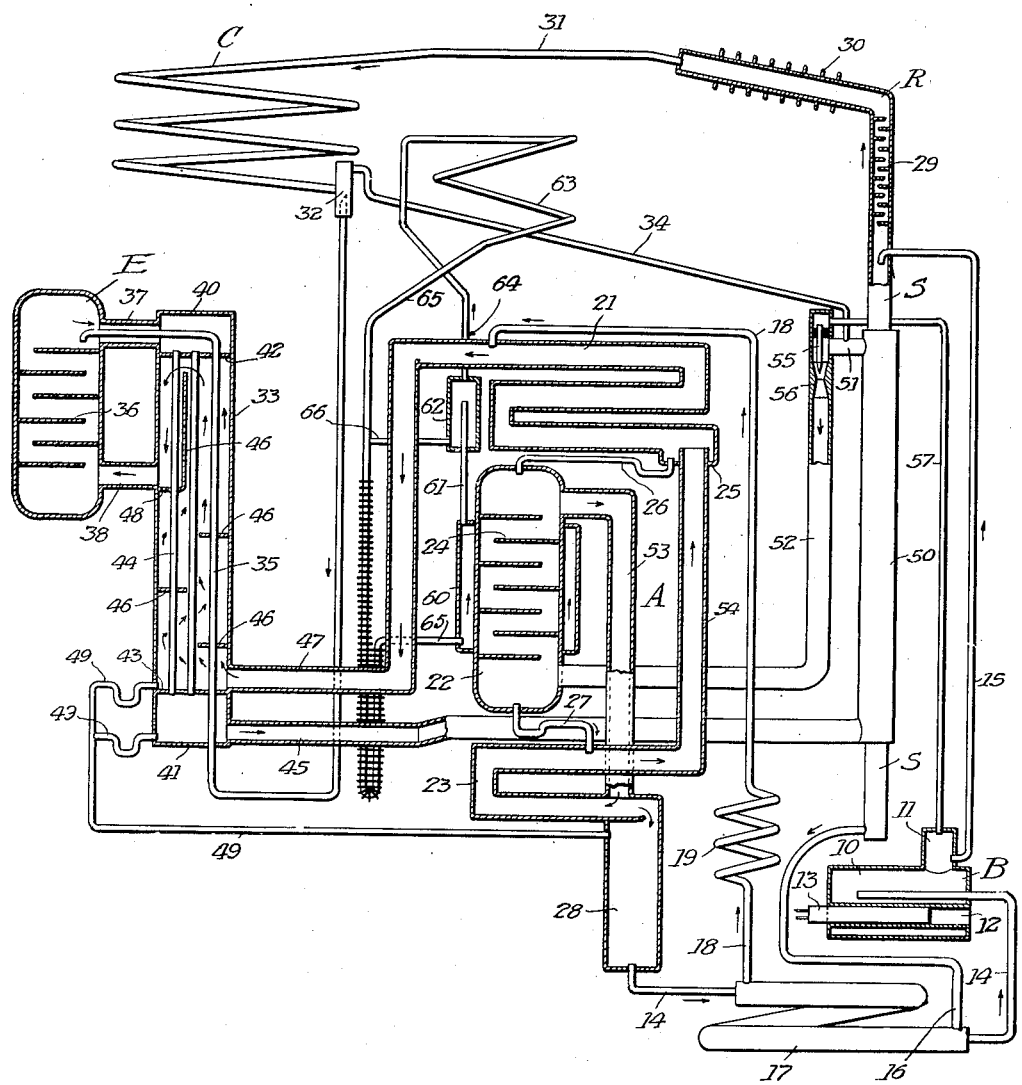
Fig. 1 is a schematic diagram of a complete refrigerating system illustrating the principles of the invention and in which the parts are spread out to permit a better understanding of the mode of operation but in which the parts are not drawn to scale with an actual working construction.

Referring first to Figure 1 of the drawings, wherein the invention is schematically illustrated as embodied in an air cooled system employing inert gas, the apparatus is shown as consisting of a boiler B, a gas separating chamber S, a rectifier R, a main condenser C, an evaporator E and an absorber A as essential parts, these being connected by a plurality of conduits, some of which are in heat exchange relation, these elements together with minor devices constituting the complete refrigerating unit.

The boiler B consists of a horizontally disposed cylindrical vessel 10 having the cylindrical dome 11 mounted thereon. Provision is made for heating the boiler by passing heat through the tube 12 in the lower portion of the cylinder 10, the tube being adapted to receive an electric cartridge heater 13 or other heating means. Absorption liquid is supplied to the boiler through the conduit 14 which enters the cylinder 10 above the tube 12 and extends nearly the entire distance across the cylinder 10 in close proximity with the tube 12 so as to warm the entering absorption liquid as it enters the boiler. This arrangement also prevents the formation of a "dead end" in the boiler, since it causes the entering liquid to stir or agitate that already in the vessel and produce an eddy current.

A small conduit 15, preferably of about ¼ inch inside diameter functions as a gas lift pump to convey both the vaporized refrigerant and the weakened absorption solution to the top of the separator S. The liquid is lifted by the passage of bubbles of gas through the conduit 15 as is now well known in the absorption refrigerating art.

The gas separating chamber S is merely a vertically disposed pipe which may be of about 1 inch in diameter. As will be described later, it is provided with a jacket 50. At the bottom of the gas separating chamber S, a conduit 16 provides for the flow of absorption solution downwardly through to the outer jacket 17 of a liquid heat exchanger consisting of the jacket 17 and the conduit 14. From the jacket 17 a conduit 18 conveys liquid to the absorber. Near its lower end the conduit 18 is coiled or reversely bent as shown at 19 to provide means for discharging heat from the liquid to the atmosphere. This coil as well as all the heat dissipating elements of the unit may be provided with heat radiating fins, if desired.

The absorber itself is made of three parts designated 21, 22 and 23. The upper part 21 and the lower part 23 are made of pieces of pipe of an inch or an inch and one quarter in diameter welded or otherwise secured to each other so as to form a tortuous path. The actual construction of these parts is best shown in Figure 2 wherein the vessels 21 and 23 are shown as made of horizontal pieces of pipe having beveled ends connected by similar but shorter vertical sections, while the vessel 22, like that of previously known absorbers, consists of a closed vertically disposed cylinder having a series of staggered baffle plates 24 therein (see Figs. 1 and 4).

The absorption liquid flows through the absorber merely by gravity, passing first across the horizontal pieces of pipe in the part 21 into a sump 25 at the lower end thereof, then through a pipe 26 which is provided with a U-bend to prevent the passage of gas therethrough into the part 22. A second U-pipe 27 is connected to the bottom of part 22 for draining liquid into the part 23. After flowing across the pieces of pipe in the lower part, the absorption solution drains into a reservoir 28 from which it flows back to the boiler B.

The refrigerant vapors generated in the boiler B after being conveyed through the gas lift pump conduit 15 as mentioned above, pass through the rectifier R which may be an integral part of the separator S provided with a series of rectifier cups or plates 29 on the inside thereof and a series of heat radiating fins 30 on the outside. From the rectifier the vapor passes through the conduit 31 into the condenser C. If the condenser is air cooled it must have a larger heat discharging area than would be required were the condenser water cooled. Small size tubing (¼ or ⅜ inch inside diameter) provided with heat radiating fins is now extensively used in the art and may be used in the present case for the condenser. As will be explained later in connection with the Figures 2 and 3 the condenser is preferably located on the top of the refrigerator cabinet so as to be freely exposed to the air.

As the refrigerant condenses in the condenser it passes into a small chamber 32, the upper end of which may be connected by conduit 34 to the gas conduit 51, as shown, or to the conduit 52 or heat exchanger 33. The conduit 34 provides for the removal of any inert gas which might otherwise accumulate in the vessel 32. A conduit 35, the upper end of which is beveled, connects the lower portion of the chamber 32 to the evaporator B for conveying condensate to the latter. The conduit 35 first passes downwardly to a point below the gas heat exchanger 33 and then upwardly through the same as shown.

The evaporator may be of the usual type, consisting of a cylinder closed at the top and bottom and provided with a series of baffle plates 36 arranged in staggered relation to provide sufficient surface to bring the refrigerant into intimate relation with the inert gas therein so as to promote evaporation thereof. A gas conduit 37 connects the upper portion of the evaporator to the upper part of the gas heat exchanger 33 while a gas conduit 38 connects the lower portion of the evaporator to the central part of the gas heat exchanger 33. The gas heat exchanger itself, consists of a vertically disposed outer cylinder provided with end pieces 40 and 41 and two inner partitions designated 42 and 43, each disposed a short distance from the end pieces 40 and 41. A plurality of tubes 44 connect the chambers formed by the end pieces 40 and 41 and the partitions 42 and 43 so that the gas may flow downwardly from the upper chamber to the lower. Thus the gas enters the heat exchanger from the evaporator through the conduit 37 and is discharged through the conduit 45. Ordinarily where a vertically disposed gas heat exchanger has been proposed or has been used heretofore an effective heat transfer has not been possible due to the fact that the warm gases do not come into intimate contact with the conduits containing the cool gases. By providing baffles such as illustrated at 46 heat may be effectively transferred. As is shown in Figure 1 the upper of these baffles is connected to and extends inwardly and upwardly from the outer cylindrical wall of the heat exchanger from a point just below that where the conduit 38 is connected thereto. This baffle together with those arranged in staggered relation in the lower part have the effect of lengthening the heat exchanger in that they cause gas which enters the central part of the heat exchanger from the absorber through a conduit 47 to flow back and forth across the pipes 44 as indicated by the arrows, as they pass to the top of the central portion of the heat exchanger and then downwardly to the left of the upper baffle 46, and out through the conduit 38 to the evaporator.

In order to prevent the accumulation of liquids in the evaporator and in the gas heat exchanger the lower portion of the baffle is provided with an opening as indicated at 48 while the lower portions of the gas heat exchanger are provided with drain pipes 49 provided with U-bends for draining liquid into the reservoir 28. Coming from the heat exchanger through the conduit 45, the inert gas flows to a jacket 50 surrounding the gas separating chamber S. In passing upwardly through this jacket, it is heated by the separator so as to facilitate circulation. It then passes through a short horizontal conduit 51 into a conduit 52, the upper end of which is provided with a venturi 56 and a nozzle or jet 55 fed by refrigerant gas from the boiler B through a conduit 57. This imparts a further driving impulse to the gases.

The lower end of the conduit 52 is connected to the absorber. It will be seen that not only is the absorber of an unusual construction but the inert gas flows therethrough in a very peculiar manner. The gas first passes from conduit 52 to the bottom of the part 22 of the absorber. In the construction shown, a large portion of the absorption takes place in part 22 and this vessel may be regarded as the main part of the absorber, the parts 21 and 23 being in a way only auxiliary thereto. The inert gas passes upwardly through the vessel 22 then out at the top through a conduit 53 which conveys it to the lower portion of the part 23. After flowing upwardly therethrough it passes upwardly through a conduit 54 and into the lower end of the part 21, from which it passes back to the gas heat exchanger through the conduit 47 and then back to the evaporator.

The main part or section 22 of the absorber operates at a high temperature and discharges a considerable quantity of heat due to the fact that it is in this section that the greater amount of absorption takes place, the absorption of course generating heat. It is thus possible to provide for a large heat discharge from the absorber vessel 22 so that it may be directly air cooled and at the same time limit the dimensions to the small space provided in an ordinary refrigerator cabinet. When so constructed improved operation over that of an ordinary absorber results from the fact that the vessel 22, being relatively warm dissipates a large amount of heat while the parts 21 and 23 dissipate a lesser amount of heat but operate to further reduce the vapor pressure of the refrigerant than is possible in the vessel 22 due to the fact that they operate at a temperature very near that of the cooling medium, which in this case is the air. Thus it is advantageous to provide an arrangement, in which the part 22 is thermally isolated from the other parts to prevent it from warming the latter. In accordance with the present disclosure means is provided not only for thermally isolating the part 22 from the other parts, to a large extent, but also for transferring the point of ultimate heat discharge for the part 22 to a location where the air may freely circulate. This is accomplished by a novel indirect cooling system now to be described and in which a transfer of heat is effected partly by flow of a cooling medium in heat transfer relation with the absorber vessel 22 and partly by vaporization of a portion of this cooling medium. In Figure 1 this indirect cooling system is indicated as consisting of a jacket 60 surrounding a portion of the absorber vessel 22, a small vertically disposed conduit 61 which functions as a gas lift pump, a gas separating chamber or vessel 62, a condenser 63 connected to the separator 62 by the conduit 64 and a return conduit 65, and a small horizontal conduit 66 connecting the lower portion of the gas separating chamber to the mid-point of the conduit 65. The conduit 65 before making connection with the jacket 60 extends to a point well below that vessel and is provided with a number of heat radiating fins as indicated.

The actual construction of the indirect cooling system is shown in detail in Figure 4. As will be seen a series of small pipes 67 are used instead of the jacket 60 of Figure 1, these pipes being brought into communication with each other at the top and bottom by means of headers 68. The conduits themselves are sufficiently small to function as gas lift pumps so that a conduit such as indicated at 61 in Figure 1 is unnecessary. Aside from this the arrangement is the same as indicated in Figure 1, the system acting to dissipate heat from the absorber vessel 22 by causing the transfer of heat to the condenser coil 63 and to the heat radiating fins on the lower portion of the conduit 65. It will be seen that with this arrangement, the cooling system is not connected to the remainder of the apparatus for the flow of fluids. Certain features of the invention are not limited to this cooling system, however, and the arrangement shown and described in the copending application of R. S. Nelson, Serial No. 527,146, filed April 2, 1931 for "Absorption refrigerating apparatus" may be employed.

This cooling system may be filled with a liquid such as ammonia to approximately the central portion of the separating chamber 62. Upon heat being transferred from the vessel 22, to the pipes 67 a portion of the refrigerant will be vaporized and will pass upwardly through these conduits and in so doing carry the remainder of the liquid with it into the gas separating chamber 62. From the gas separating chamber the liquid will flow through the conduit 66 into the lower portion of the conduit 65 and return to the gas lift pumps 67. The generated vapor conveyed to the gas separating chamber 62 will pass through the condenser coils 63 wherein it will condense and then return to the conduits 67 through the return pipe 65. In this way the absorber vessel 22 is cooled to some extent by the convection of the liquid refrigerant which circulates through the conduit 66 and the lower portion 65 but mainly by vaporization of refrigerant which circulates through the conduits 67, condenser 63 and the return conduit 65. Some heat is also discharged directly to the atmosphere from the vessel 22 but this quantity is small compared to that discharged through the condenser 63.

Referring now to the structural details of assembly illustrated in Figures 2 and 3, it will be seen that the apparatus diagrammatically shown in Figure 1 may be assembled in the side or back of a refrigerating cabinet. To avoid complications in illustrating, the indirect cooling system for the absorber vessel 22 is not shown in Figures 2 and 3. The manner in which this cooling system is incorporated into the apparatus will be apparent however, from an inspection of Figure 4.

In Figures 2 and 3 the refrigerator cabinet is indicated at 75. It may be of the usual type consisting of a compartment for the holding of food or the like which occupies the greater portion of the space as indicated at 76 and an elongated compartment along one side or the back for the retention of the refrigerating system as indicated at 77. For supporting the small outer condenser 63 of the indirect cooling system for the absorber vessel 22 and for supporting and somewhat hiding from view the main condenser C of the unit, a rectangular shield or baffle 78 is mounted on the top of the cabinet by means of supporting brackets or legs 79. Because of the location of these two condensers, the greater amount of heat dissipated from the unit is dissipated at a point above the cabinet. Some heat is also dissipated along the side of the unit, however, from the cooling coil 79, the absorber, particularly the parts 21 and 23, and from the lower portion of the conduit 65 of the indirect cooling system. The parts 21 and 23 of the main absorber are preferably provided with a number of heat radiating fins so as to cause these parts to operate at as low a temperature as is possible with air cooling.

To prevent the heat supplied to the boiler from adversely affecting the operation of the system due to the proximity of the boiler and elements warmed by it to the absorber, insulation should be provided in accordance with the usual practice. Thus the boiler B, gas separating chamber S, together with the jacket 50 surrounding the same and the liquid heat exchanger 17 should be provided with insulation. The gas heat exchanger 33 should also be insulated because of its proximity to the absorber vessel 22.

The apparatus disclosed may be charged and operated as follows, using ammonia, water and hydrogen as the refrigerant, absorption liquid and the inert gas respectively, although of course the invention is not limited to the use of these fluids.

Ammonia solution of 25 to 30% concentration may be supplied to the unit through a valve on the reservoir 28. While the boiler is being heated by passing two or three hundred watts through the electric cartridge heater so as to cause circulation of the solution, the unit should be swept free of insoluble gas by means of ammonia gas. Hydrogen may then be introduced up to 250 to 350 pounds gage pressure. The hydrogen is of course, introduced at some point either in the evaporator or the absorber by means of a valve not shown. After the hydrogen is introduced the heat input may be increased to 400 watts. After the unit is so charged it may be necessary to trim the unit, that is, remove a certain excess of solution or hydrogen depending on the operating conditions. The solution should, of course, not stand above the gas inlet to the absorber. Also, if the level of the solution is too high the solution may circulate too fast.

The indirect cooling system for the absorber vessel may then be charged and put into operation. It should first be evacuated to remove as much air as possible and then swept out with a stream of ammonia gas. Liquid anhydrous ammonia may then be added to a level above the gas separating chamber of this system. By putting in an excess of liquid ammonia and then purging the condenser from time to time after the unit has been in operation a little while the last traces of foreign gases may be finally removed.

From the above description it will be apparent that the absorption solution will circulate as follows: From the boiler B through the gas lift pump 15, gas separating chamber S, conduit 16, heat exchanger 17 and conduit 18 to the absorber, after being precooled by passing through the reversely bent pipe 19. After passing downwardly through the absorber into the reservoir 28 it flows back to the boiler through conduit 14.

The circuit for the refrigerant is from the boiler B through the gas lift pump 15, rectifier R, conduit 31, condenser C, vessel 32, conduit 35 into the evaporator where the ammonia evaporates. It is then carried by the inert gas through the conduit 37 into the heat exchanger, passes from the top to the bottom through the tubes 44 and leaves through the conduit 45. It then flows upwardly through the jacket 50 around the gas separating chamber, passes through conduits 51 and 52 and into the absorber where the refrigerant is absorbed by the absorption solution and carried back to the boiler through the reservoir 28 and conduit 14.

The inert gas circuit, particularly the manner in which the gas passes through the absorber constitutes an important feature of the invention. Starting with the evaporator the gas flows through the conduit 37, then through the tubes 44 of the heat exchanger, conduit 45, jacket 50, conduit 51 into the conduit 52 where the nozzle 55 imparts a driving force thereto, then into the lower part of absorber vessel 22, upwardly through this vessel, out through the conduit 53 into the bottom of the lower absorber vessel 23, upwardly through the vessel 23, then by the conduit 54 to the bottom of the absorber vessel 21, upwardly through the absorber vessel 21 and back to the evaporator through the conduit 47, central parts of the heat exchanger and the conduit 38. As shown particularly in Figure 2, the conduits 50, 51 and 52 constitute an inverted U-shaped conduit, one leg (50) of which is heated and the other (52) of which is cooled by the atmosphere. This particular arrangement of the gas conduits and the absorber is such that it is possible to materially reduce the heat radiating surface of the absorber from that which would otherwise be required of an air cooled unit. The arrangement operates upon a novel principle which will now be described.

The problem of air cooling is one of increasing the capacity of the unit and decreasing the size by improved means of discharging heat to the atmosphere. It has been observed that the installation of an air cooled unit in a cabinet affected the capacity adversely. This is attributed to the restricted air circulation where the cabinet partly surrounds the absorber. Means was discovered for air cooling the absorber indirectly as for example, the arrangement shown in Figure 4 but this only partly solves the problem of air cooling because although it provides effective means for heat discharge, the element so cooled operates at a temperature some 30 to 40 degrees F. above the atmosphere and this is a condition unfavorable to complete or nearly complete absorption. Accordingly auxiliary means for discharging the heat of absorption is provided in order to permit some absorption at a temperature approximately the same as that of the air.

The hottest point (if there is one in a single part of the absorber) is that at which the gas from the evaporator first contacts with the absorption solution. This point is thus the most desirable location for the indirect cooling system. Next, in order to return the circulating gas mixture to the evaporator with the lowest possible ammonia content, its last contact with the absorption solution should be with the weakest solution available at the lowest possible temperature, i. e. that of the air. This is accomplished by having a directly air cooled vessel 21 above the indirectly air cooled absorber part 22. In order for the absorber part 21 to operate at very nearly the temperature of the air the weak absorption liquid entering through the conduit 19 must be nearly at air temperature. To assist in attaining this result it is desirable that the concentrated solution leaving the absorber and passing in heat exchange relation with the weak solution in the jacket 17 of the heat exchanger be brought to as low a temperature as possible before it enters the conduit 14. If it is nearly air temperature before it enters conduit 14, it will reduce the temperature of the liquid in the jacket 17 more nearly to air temperature. During the time that it is being cooled down as it leaves the main absorber vessel 22, however, it is desirable that further refrigerant be absorbed. It is for this reason that the absorber part 23 is provided.

Accordingly the absorption process consists of the following three distinct steps:

First, the absorption of the greater part of the refrigerant from the inert gas at a relatively high temperature so that the heat may be rapidly dissipated, this being accomplished with relatively weak solution in the vessel 22 where the mixture of the inert and the refrigerant gas first enters the absorber; next, the absorption of more refrigerant at a lower temperature but with a more concentrated solution, this step taking place in the absorber vessel 23; and finally, the absorption of still more refrigerant at the lowest possible temperature (very nearly air temperature) and with the weakest possible solution, which is just entering the absorber from the boiler and which has been brought to nearly air temperature by the heat transfer in the exchanger 17 and the precooling in the precooler 19, this last step taking place in the absorption vessel 21. It is to be noted that all of these steps occur while the absorption liquid and inert gas are flowing in opposite directions through the respective parts of the absorber.

The advantages of this arrangement of absorber and conduit will now be apparent. Since the absorber vessel 21 is operating at very nearly air temperature, the effective absorption temperature has been reduced to the ideal limiting case regardless of the temperature prevailing in the main part of the absorber 22 where the greater amount of heat is discharged. Due to the fact that the absorber vessel 22 is at such a high temperature the heat flow from it is much more rapid than would ordinarily be the case. In other words, by maintaining one part of the absorber relatively warm and the other part relatively cold heat is discharged more rapidly with less heat radiating surface and absorption takes place to a greater degree than would be possible if the whole absorber were at the average temperature of the parts.

Apparently the best results are obtained when the part 22 has a larger liquid-gas contact surface than the parts 21 and 23 and for this reason it may be designated the "main" part. It is to be understood, however, that the invention is not limited in this respect and in some of the following claims, the words "main" and "auxiliary" are used merely for definiteness and are not intended as limitations as to relative sizes.

Furthermore, while the apparatus for carrying out certain principles of the invention may be one in which an indirect cooling system is employed for the absorber vessel 22 and in which inert gas is employed, and while the particular combination shown has advantages, it is to be understood that the invention is by no means limited to these details. Accordingly, various changes may be made without departing from the spirit of the invention or the scope of the annexed claims.

I claim:

1. In an absorption refrigerating system having an evaporator and a boiler, the combination of an air cooled absorber including a main vessel and an auxiliary vessel, means for supplying refrigerant vapor directly to said main vessel from the evaporator to thereby cause the main vessel to operate at a higher temperature than the auxiliary vessel, a conduit for supplying absorption liquid from the boiler to said auxiliary vessel and having means for cooling the absorption liquid as it passes therethrough, means for conveying absorption liquid from said auxiliary vessel to said main vessel, means for conveying refrigerant vapor from the main vessel to the auxiliary vessel and for cooling the same as it passes from one vessel to the other, means for conveying the absorption liquid from the main vessel to the boiler and means for indirectly air cooling said main vessel and for directly air cooling said auxiliary vessel.

2. In an absorption refrigerating system having an evaporator and a boiler, the combination of an absorber including a main vessel and an auxiliary vessel, means for supplying refrigerant vapor directly to said main vessel from the evaporator, means for supplying absorption liquid from the boiler to said auxiliary vessel, means for conveying absorption liquid from said auxiliary vessel to said main vessel, means for conveying refrigerant vapor from the main vessel to the auxiliary vessel, means for conveying the absorption liquid from said main vessel to the boiler, means for indirectly air cooling said main vessel and for causing the same to operate at a given temperature and means for directly air cooling said auxiliary vessel to cause the same to operate at a temperature lower than that of the main vessel.

3. In an absorption refrigerating system, a boiler, an absorber having a main part and an auxiliary part, conduit means for conveying liquid from said main part to said boiler, and means for conveying gas from said main part to said auxiliary part and for causing the gas to come into contact with liquid flowing through said liquid conduit means.

4. A system for transferring heat from a warm vessel in which it is generated to cooler points remote therefrom which comprises a conduit in heat transfer relation with said vessel, said conduit being adapted to act as a gas lift pump, a gas separating chamber connected to said conduit, a condenser connected to said gas separating chamber, a return pipe connecting said condenser to said conduit and a liquid conveying pipe connecting said gas separating chamber to said return pipe, the arrangement being such that a portion of a liquid in said conduit may be vaporized to cause circulation of the remainder through said conduit, said gas separating chamber and said liquid conveying pipe and to cause the vaporized portion to pass through said conduit and said gas separating chamber into said condenser where it may be condensed and returned to said conduit through said return pipe.

5. In an absorption refrigerating system of the type in which an inert gas is employed, the combination with an evaporator and an absorber of a gas heat exchanger comprising a closed vertically disposed cylindrical vessel having two partitions disposed short distances from its ends for dividing the cylinder into three compartments, tubes disposed within the central compartment for conducting gas from one end compartment to the other, baffles located in said central compartment, for causing gas flowing in said central compartment to pass across said tubes several times, one of said baffles extending inwardly and upwardly from a central portion of the wall of said cylindrical vessel to cause gas to flow upwardly and then downwardly in passing thereover, a conduit connecting one end compartment to the evaporator, a conduit connecting the other end compartment to the absorber, a conduit connecting the portion of the central compartment on one side of said inwardly and upwardly extending baffle to the absorber and a conduit connecting the portion on the other side of said baffle to the evaporator.

6. In an absorption refrigerating system of the type in which an inert gas is employed, the combination with an evaporator and an absorber of a gas heat exchanger comprising a closed vertically disposed cylindrical vessel having two partitions disposed short distances from its ends for dividing the cylinder into three compartments, tubes disposed within the central compartment for conducting gas from one end compartment to the other, a baffle located in said central compartment and extending inwardly and upwardly from a central portion of the wall of said cylindrical vessel for causing gas flowing in said central compartment to pass upwardly and then downwardly, a compartment connecting the upper compartment to the evaporator, a conduit connecting the lower compartment to the absorber, a conduit connecting the lower portion of the central compartment to the absorber and a conduit connecting the portion of said central compartment located above said baffle to the evaporator and said baffle having a small opening in the lower portion thereof below said last mentioned conduit for permitting liquid to drain from the evaporator to the lower portion of said central compartment.

RUDOLPH S. NELSON.